United States Patent
Hirato

[11] 3,932,049
[45] Jan. 13, 1976

[54] PIPE CLASPER

[76] Inventor: Motohide Hirato, 2-13-18 Hase, Kamakura, Kanagawa, Japan

[22] Filed: Oct. 18, 1974

[21] Appl. No.: 515,884

[30] Foreign Application Priority Data
May 21, 1974  Japan.......................... 49-57011[U]

[52] U.S. Cl. .............................. 403/397; 24/81 CR
[51] Int. Cl.² .......................................... F16B 7/04
[58] Field of Search ...... 403/397; 52/719, 686, 685, 52/652, 665; 24/81 CR

[56] References Cited
UNITED STATES PATENTS

| 1,185,263 | 5/1916 | Symons | 52/719 |
| 1,189,297 | 7/1916 | Schoenthaler | 52/685 |
| 2,102,566 | 12/1937 | Briekman et al. | 52/719 |
| 3,359,019 | 12/1967 | Pinkney | 403/397 |

*Primary Examiner*—Andrew V. Kundrat
*Attorney, Agent, or Firm*—George B. Oujevolk

[57] ABSTRACT

A pipe clasper is used to clasp or couple two pipes in a crossed relation to each other, which pipes may be used as construction framework. The pipe clasper according to this invention is formed of a single elastic wire bent in a predetermined form and is of simple structure. With the pipe clasper it is easy to couple two pipes firmly in a crossed relation with the pipe clasper.

1 Claim, 6 Drawing Figures

PIPE CLASPER

BACKGROUND OF THE INVENTION

1. Field of the Invention

This invention relates to a pipe clasper for coupling two pipes in a crossed relation to each other. The pipe clasper is formed of a single elastic wire bent in a predetermined form. The pipe clasper, which is a simple structure, is effective to clasp two pipes firmly in a crossed relation with easy manupulation and is inexpensive.

2. Description of the Prior Art

Recently, agricultural management has turned from a natural form to a house culture and in particular vinyl-house culture is widely employed. Such vinyl-house is constructed with framework composed of steel pipes coupled to each other and having vinyl sheets attached thereto. In construction of the framework, there are a number of places where two pipes are coupled in a crossed relation to each other and the most conventional method for coupling these two pipes in a crossed relation was to bind them with strings. However, the binding with strings has disadvantages that require much labor and a sufficient coupling strength cannot be secured. There have been proposed various methods of coupling instead of the binding with strings, however, these prior art methods have disadvantages in that the structure is complicated, coupling operation is difficult and the method is expensive.

SUMMARY OF THE INVENTION

It is an object of the present invention to provide a pipe clasper suitable for coupling steel pipes which may be used as the frame work of vinyl houses, in a crossed relation.

It is another object of the present invention to provide a pipe clasper consisting of a single elastic wire bent in a predetermined form, which clasper is effective to couple two steel pipes very firmly in a crossed relation to each other owing to their elasticity.

It is further object of the present invention to provide a pipe clasper so constructed that the operation of coupling two pipes in a crossed relation and of detaching them can be easily achieved.

BRIEF DESCRIPTION OF THE DRAWINGS

The above and other objects and advantages will be clearly understood by the following description taken by reference to accompanying drawings in which.

DESCRIPTION OF THE PREFERRED EMBODIMENTS

Figure 1:
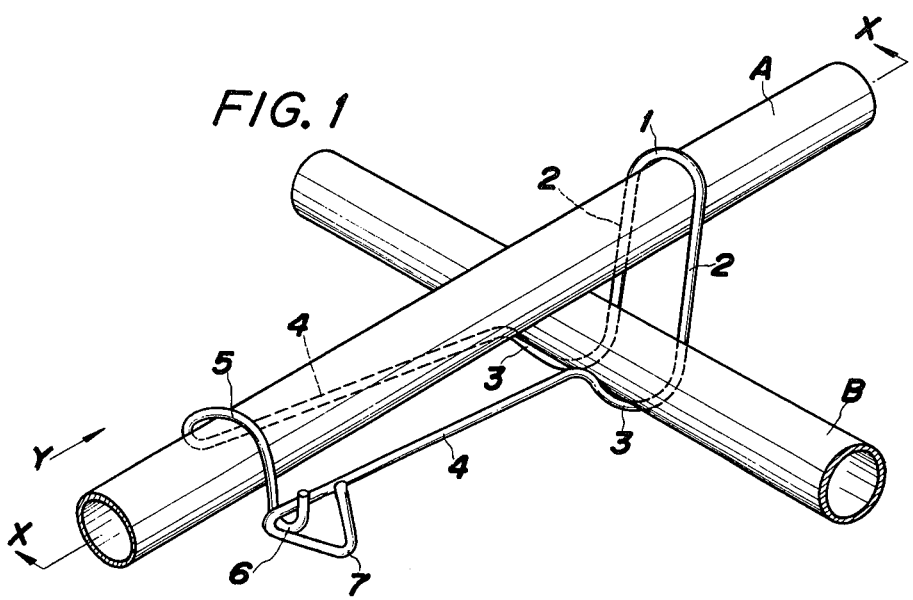
FIG. 1 is perspective view showing two pipes coupled in a crossed relation to each other with the pipe clasper according to this invention.
Figure 2:
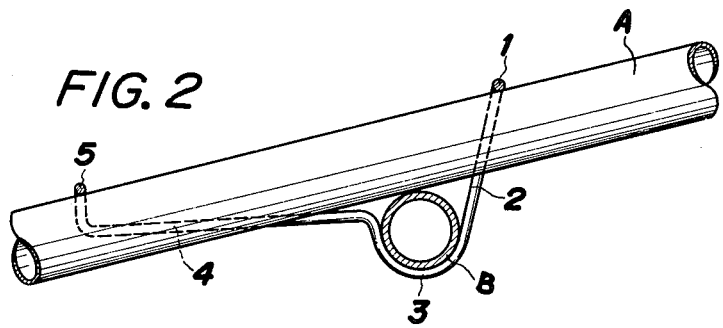
FIG. 2 is a sectional view taken along the line X-X of FIG. 1.
Figure 3:
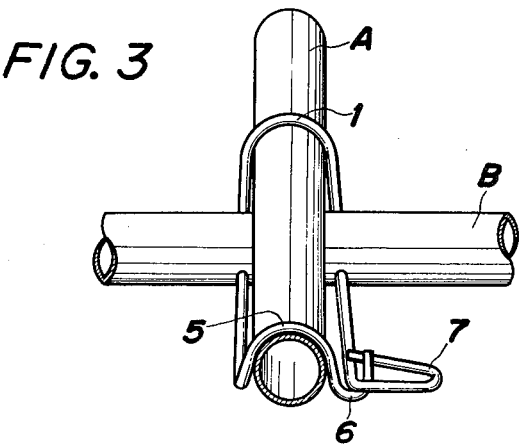
FIG. 3 is a view of the two pipes coupled with the pipe clasper as viewed from the direction Y of FIG. 1 and FIGS. 4 to 6 are perspective views showing modified embodiments of the pipe clasper.

Referring now to FIGS. 1 through 3, a pipe clasper according to the present invention is made of a steel wire having high elasticity, which may have a diameter of the order of about 3 mm, and comprises a first retaining portion 1 bent in a semi-circular shape for holding the first pipe A, a pair of straight portions 2 extending slightly slantwise and downwards in parallel from both lower ends of the retaining portion 1 and a second retaining portion 3 bent upwards in a semi-circular shape from the lower ends of the straight portions 2. The plane containing the second retaining portion 3 is at right angles to the plane containing the first retaining portion 1 and thus the first and the second pipes A and B held in the retaining portions 1 and 3, respectively are located at right angles to each other. The maximum height between the first retaining portion 1 and the second retaining portion 3 will be substantially equal to the sum of the diameter of the pipes A and B. The upward bent portions of the second retaining portion 3 extend horizontally in paralled to provide a pair of horizontal straight portions 4. The length of the pair of straight portions 4 is determined as desired and preferably made longer than the length of the vertically parallel straight portions 2 extending slightly slantwise. In this way, it is possible to provide rigid coupling of the pipes by effective use of elasticity of the horizontal straight portion 4.

One of the pair of horizontal straight portions 4 has one end bent in a semi-circular shape towards the other of the horizontal straight portions 4 or in the direction perpendicular to their longitudinal direction so that an engaging portion 5 is provided to clasp the first pipe A elastically. The engaging portion 5 is bent on the same side as the first retaining portion 1 so that the portion 5 may engage with the upper surface of the pipe A. The engaging portion 5 is turned up at its end in a U-shaped to provide a reception and engagement portion 6 for receiving the end of the other horizontal straight portion 4. The other horizontal straight portion 4 has its end horizontally bent in a triangular shape just after passing the reception and engagement portion 6 to provide a hook portion 7.

Two pipes A and B are coupled at right angle to each other by holding the pipes A and B at right angle in the first and the second retaining portions 1 and 3, bringing the pipe A into engagement with the engaging portion 5 elastically and engaging the other horizontal straight portion 4 with the U-shaped reception portion 6. In this way, the two pipes A and B are very firmly coupled to each other since the engaging portion 5 urges the pipe A downwards with elasticity of the two parallel horizontal straight portions 4, 4.

Coupling may be taken off by bringing up the hook portion 7 in such a manner that the end of the other horizontal straight portion 4 may be disengaged from the U-shaped reception portion 6. It is to observed that the triangular shape of the hook portion 7 allows ready hooking and taking off of the end of the engaging portion 5.

Figure 4:
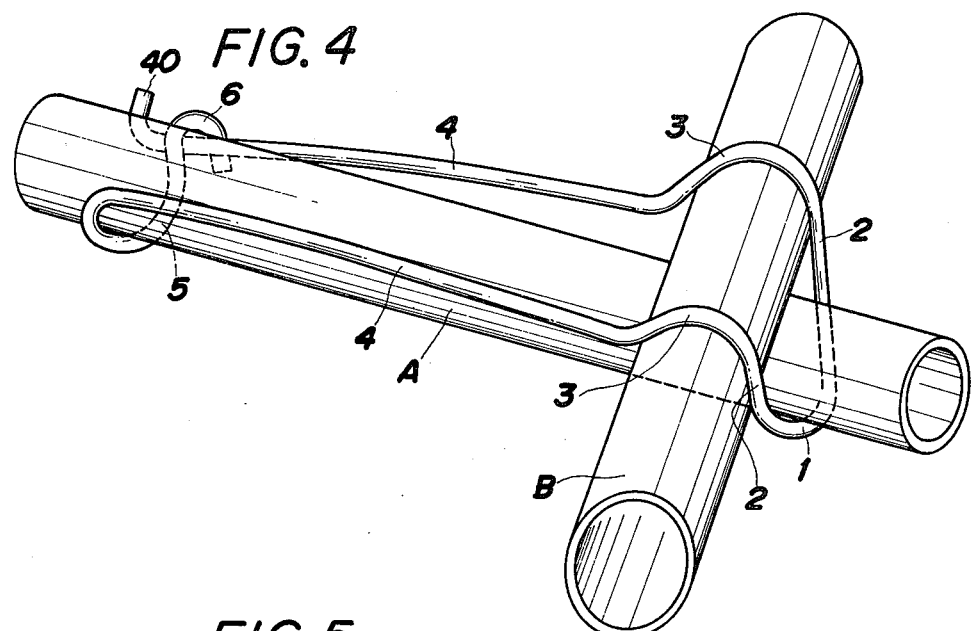
Figure 5:
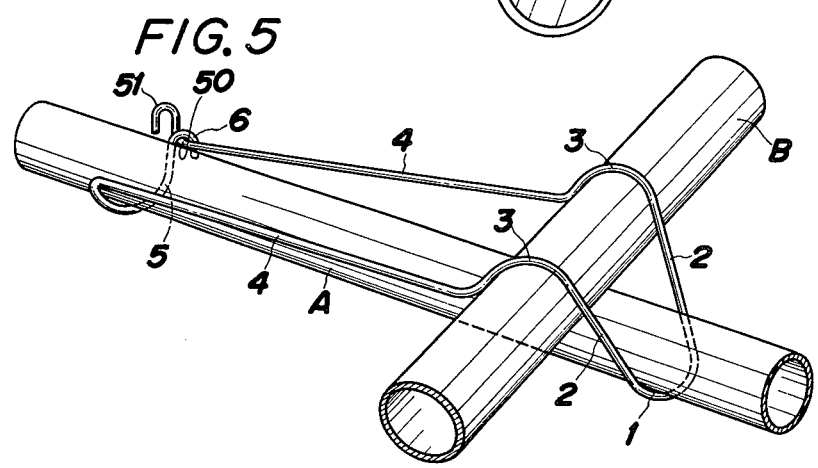
Figure 6:
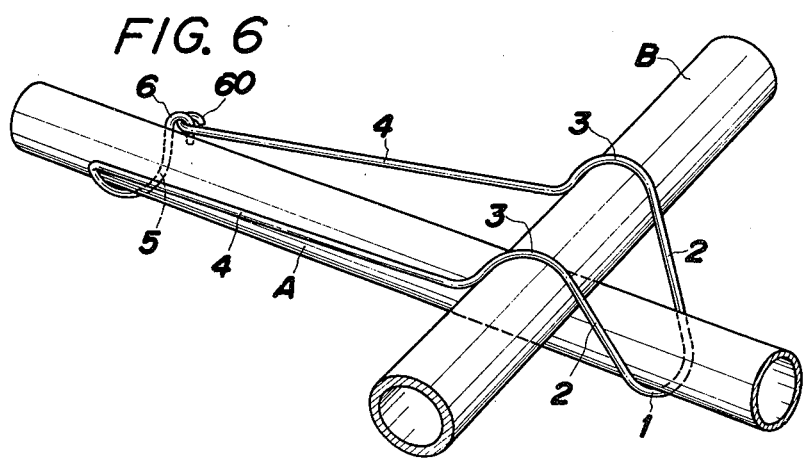

FIGS. 4 to 6 illustrates another embodiments of the pipe clasper according to the present invention in which the engaging portion 5 and the engaging end of the other horizontantal straight portion 4 are modified in structure. In FIG. 4, the end 40 of the other horizontal straight portion 4 which is in engagement with the U-shaped reception portion 6 of the engaging portion 5 is bent at right angle so that contacting engagement is merely provided.

In FIG. 5, the end 50 of the other horizonal straight portion 4 is bent at right angle at the place where the porton 4 is in contact with the U-shaped reception portion 6, and is then further turned in the opposite direction in the shape of U at 51.

FIG. 6 shows an embodiment in which the horizontal straight portion 4 has a circular portion 60 formed at its end into which the opening end of the U-shaped reception portion 6 is brought for engagement.

What is claimed is:

1. A pipe clasper made of an elastic steel wire comprising a first retaining portion bent in a semi-circular shape with two defined lower ends at substantially the central part of the wire for holding a first pipe, a pair of straight portions extending slantwise in parallel to each other from both said lower ends of said first retaining portion, a second retaining portion bent in a semi-circular shape at the lower ends of said pair of straight portions for holding a second pipe, and a pair of straight portions horizontally extending from the both ends of said second retaining portion, the end of one of said pair of horizontal straight portions being bent in a semi-circular shape to provide an engaging portion for said first pipe and a U-shaped reception portion at the end thereof and the end of the other horizontal straight portion having its end horizontally turned in a triangular shape to provide a hook portion adapted to engage with said U-shaped reception portions.

* * * * *